INVENTOR.
*Harry A. Williams.*
BY
*Herbert M. Birch*
ATTORNEY

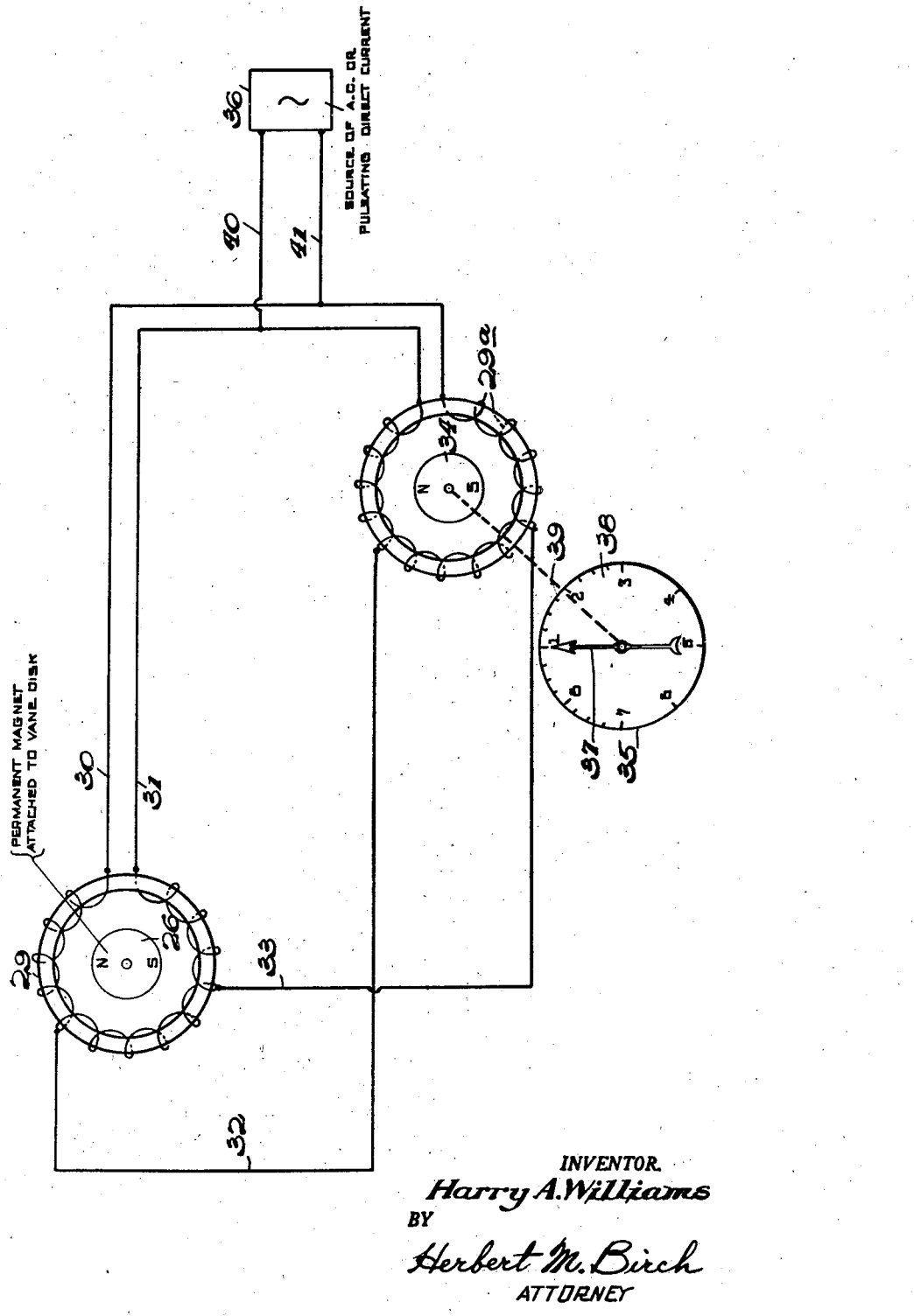

Patented June 24, 1947

2,422,762

UNITED STATES PATENT OFFICE 2,422,762

REMOTE INDICATING FLOWMETER

Harry A. Williams, Glenside, Pa., assignor to Bendix Aviation Corporation, Teterboro, N. J., a corporation of Delaware Application October 12, 1943, Serial No. 505,979

3 Claims. (Cl. 73—228)

1

The present invention relates to flowmeters and more particularly to remote indicating flowmeters.

An object of the invention is to provide a novel system of fluid flow measurement for use where remote indications are desired.

Another object of the invention is to provide a novel fluid flowmeter and remote indicating system which is simple in construction, accurate, durable and economical to manufacture.

Another object is to provide a flowmeter having a novel coupling structure for housing means designed to cooperate with an electromagnetic indicator system.

The above and other objects and advantages of the present invention will appear more fully hereinafter from a consideration of the detailed description which follows, taken together with the accompanying drawings wherein one embodiment of the invention is illustrated. It is to be expressly understood, however, that the drawings are for the purpose of illustration only and are not designed as a definition of the limits of the invention. Reference for this latter purpose should be had to the appended claims.

In the drawings, wherein like reference characters refer to like parts throughout the several views, Figure 1 is a longitudinal section through a flowmeter embodying one form of the present invention.

Figure 6 is a diagrammatic view of one form of electromagnetic remote indicating system, such as may be used with the present device.

Figure 1:
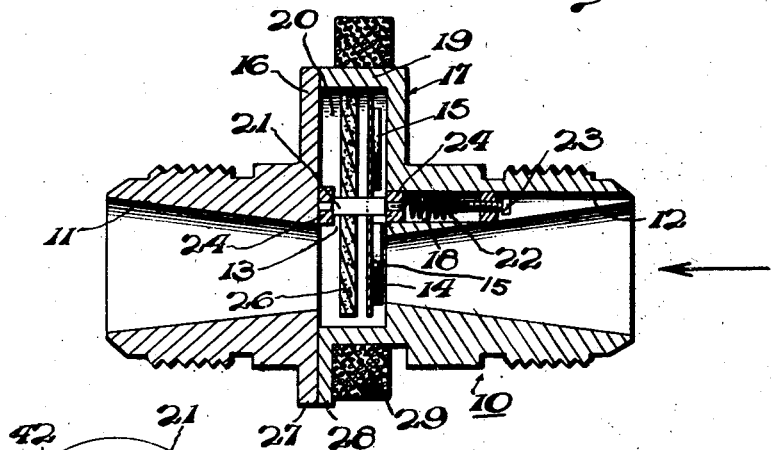
Figure 2:
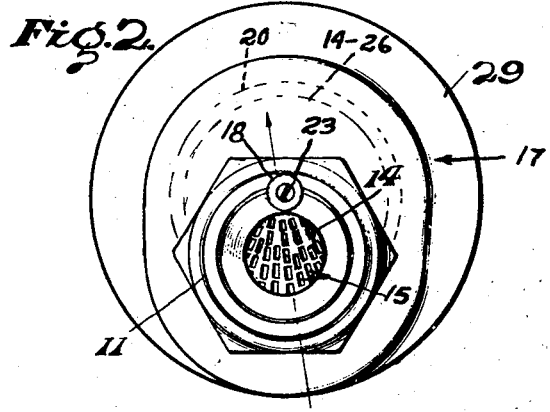
Figure 2 is an end elevational view of Figure 1 looking in the direction of the fluid inlet.

The arrangement of Figures 1 and 2 includes a body 10 composed of sections 11 and 12 of non-magnetic material, which when coupled together form a conduit tapered from both ends, so as to provide a throat portion 13 at the center section.

Figure 3:
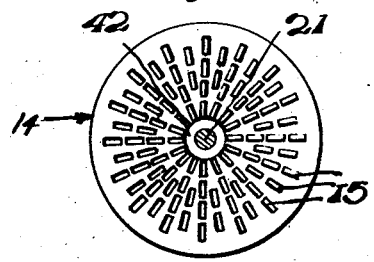
Figure 3 is one form of impeller or vane structure used in the flowmeter.

Suitably mounted to scan, span or extend across the throat portion 13 is a flow responsive member or impeller 14, such as a disc of sheet metal or other suitable material. The disc has stamped from its surface a plurality of vanes 15, as shown in Figure 3 for example. The vanes 15 are set at predetermined angles, so that reaction of the fluid upon the vanes tends to rotate the impeller 14, the amount or degree of angular motion of the member or impeller 14 varying with the angle or angular adjustment of the vanes 15 which are shown as narrow and

2 wide respectively at the top and bottom portions of the impeller 14 in Figure 1.

In Figure 1, each section 11 and 12 has an enlarged annular portion eccentric to the center axis of the throat 13. The section 11 is on the outlet side and has a relatively large annular portion 16 and section 12 on the inlet side with a portion 17 flanged over to provide a top wall 19 and thereby define a chamber 20 in communication with throat portion 13. Directly above throat portion 13 axially parallel with the center line of flow through body 10 is a shaft 21 having reduced ends journalled in suitable means, such as bearings 24 secured to each side wall of chamber 20.

A calibration spring 22 is attached to an extension of shaft 21 at an end thereof and to an adjustable means, such as screw 23 at the other end in elongated bore 18 in section 12. The spring 22 serves to balance the system according to fuel flow as hereinafter explained under the heading "Operation."

Suitably secured to shaft 21 is impeller 14, so as to overlap, span or extend across the throat opening 13 at the intake side. Also secured on shaft 21 is a permanent transmitting magnet rotor 26, so as to rotate with impeller 14. The impeller 14 may be press fitted or otherwise detachably secured on the shaft 21 so that the latter will turn or be angularly displaced therewith resisted by the calibration spring 22 which is wound thereby.

The body sections 11 and 12 have opposing flanges 27 and 28 formed from the eccentric opposed annular portions 16 and 17 adapted to seal the portions of the body together.

Around the outside of chamber 20 and magnet rotor 26 is mounted a transmitter stator comprising a transmitting coil 29. In Figure 6 the coil 29 is shown connected through leads 30—31, 32—33 to a complementary receiver or repeater stator comprising a receiving coil 29a concentrically mounted around a permanent receiving magnet rotor 34 of a suitable indicator, such as 35. Connected to leads 30—31 is a suitable source of power, such as 36, by leads 40—41. Magnet rotor 34 is connected by shaft 39 with a pointer 37 adjacent a dial 38, so as to give indications of fuel flow.

Operation

In operation the fluid flows through the body 10, and in passing through the impeller 14 and the vanes 15, causes the impeller to rotate in opposition to the calibrated spring 22, until the torque produced by the fluid flow is balanced by the torque set up in the calibration spring 22, at which point the system is in balance for a particular rate or volume of flow. Obviously, a change in rate or volume of flow will cause the vanes to assume a new position.

Upon any rotation of impeller 14 a corresponding rotation is imparted to transmitter magnet rotor 26, which distorts the magnetic field set up by transmitter coil 29 mounted outside the body 10 and through leads 30—31 and 32—33, a similar field is set up in receiver coil 29a. This causes the receiver magnet rotor 34 concentrically mounted within the coil 29a to assume the same relative position as transmitter magnet rotor 26, which as it changes position rotates pointer 37 through shaft 39 over dial 38 to give indications of fluid flow.

Figure 4:
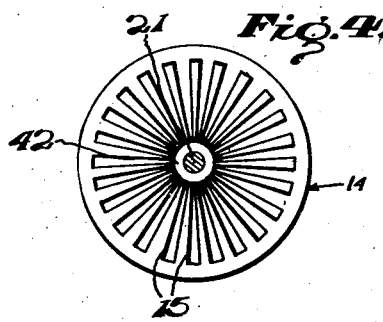
Figure 4 is another form of impeller or vane structure used in the flowmeter.

In Figure 4 is shown another embodiment of vane construction, such as may be used in the practice of the present invention. In this form the vanes 15 stamped from a disc are elongated and may extend continuously from the center of the disc.

Figure 5:
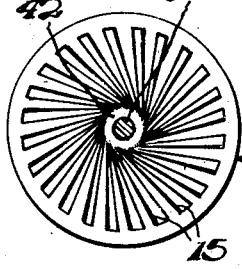
Figure 5 is another form of impeller or vane structure used in the flowmeter.

In Figure 5 is shown a still further form of vane, such as may be used, wherein the vanes are stamped out from a central circular area 42 around the shaft aperture at a tangent with respect to the outer circumference of said area.

The operation of the structures shown in these figures is otherwise the same as previously described. If desired, substitution may be made of the various types of disc vanes having different angles of pitch for more efficient cooperation with the adjustments of the calibration spring 22.

The feature of detachable vane discs of different types is particularly desirable to measure fluides having varying viscosities and densities.

There is thus provided a novel remote measuring system of fuel flow in combination with certain hereinbefore described novel elements and novel arrangements thereof. Such apparatus is adapted for easy installation as an accessory and may be used to measure fluid flow in either mobile or non-mobile objects and is easily adjusted for accurate performance in accordance with the viscosity and density of the fluid.

Although only three embodiments of the invention have been illustrated and described in detail, it is to be expressly understood that the same is not limited thereto. The magnet 26 may be of any suitable form and mounted in any suitable way to turn or be angularly displaced with the shaft 21 and impeller 14 under the action of fluid flow on the latter. Various changes also may be made in the design and arrangement of the parts illustrated, as will now be apparent to those skilled in the art. For a definition of the limits of the invention, reference should be had to the appended claims.

What is claimed is:

1. Apparatus for measuring the flow of fluid through a body having an inwardly converging bore and a throat portion at said inwardly converging portions, comprising an annular chamber around said throat portion, an impeller rotatably mounted in said chamber coaxially with said chamber and having a portion extending through said throat portion, resilient means adapted to oppose the rotation of said impeller, said impeller having circuit controlling means rotatably mounted therewith, an indicator for measuring the flow of fluid, means for moving said indicator in accordance with the rotations of said impeller, said means including a source of energy, a transmitter coil associated with said controlling means, repeater means in circuit with said transmitter coil and said source of energy, and indicator driving means mechanically connected to said repeater means.

2. A fluid flow determining system comprising a body with a venturi to provide a restricted throat portion, and a chamber around said portion, means responsive to fluid flow in the throat portion of said body, said means having a shaft mounted on an axis in spaced parallel relation to the axis of the throat portion in said chamber to extend across said throat portion, calibrated resilient means mounted in the body coaxially with said first axis and associated with said first means by connection to the shaft thereof, the torque produced by said resilient means being adapted to balance the torque produced by the fluid flow, electrical transmitter means having a magnet rotor mounted to be angularly displaced by connection with the first-named means within the chamber and a stator coil around the chamber and rotor, electrical receiver means having a magnet rotor and a stator coil in circuit with said transmitter coil, a source of electrical energy connected to the transmitter and receiver coils to establish synchronism therebetween, and means connected to the receiver rotor to indicate values in fluid flow through the throat portion and adapted to be displaced by said receiver rotor.

3. A fluid flow system comprising a body having a venturi, and an outwardly projecting portion at one side forming an internal chamber communicating with the venturi at one side, angularly displaceable means responsive to fluid flow through the venturi mounted in the chamber outwardly of the venturi to extend across the venturi substantially perpendicular to the axis thereof to be angularly displaced by the flow of fluid through the venturi, resilient means in the body coaxially of the chamber and associated with the first means, the torque produced by said resilient means being adapted to balance the torque produced by the fluid flow at predetermined rates of fluid flow, electromagnetic transmitter means coupled to the angularly displaceable means adapted to be operated thereby, electromagnetic receiver means in circuit with said transmitter means, and a source of electrical energy connected to the transmitter and receiver means to maintain the same in synchronized positions.

HARRY A. WILLIAMS.

REFERENCES CITED

The following references are of record in the file of this patent:

UNITED STATES PATENTS

| Number | Name | Date |
|---|---|---|
| 1,637,927 | Bonn | Aug. 2, 1927 |
| 595,876 | Gay | Dec. 21, 1897 |
| 2,259,615 | Chappell et al. | Oct. 21, 1941 |
| 2,315,185 | Boyle | Mar. 30, 1943 |
| 597,066 | Marsh | Jan. 11, 1898 |
| 1,607,917 | Rowland et al. | Nov. 23, 1926 |
| 706,281 | Thierman | Aug. 5, 1902 |
| 177,840 | Hoxie | May 23, 1876 |
| 1,072,189 | Sparks | Sept. 2, 1913 |
| 2,270,141 | Potter | Jan. 13, 1942 |
| 1,148,833 | Edmunds | Aug. 3, 1915 |
| 2,342,637 | Bechberger | Feb. 29, 1944 |

FOREIGN PATENTS

| Number | Country | Date |
|---|---|---|
| 253,248 | Germany | Nov. 5, 1912 |
| 15,073 | Great Britain | Oct. 7, 1909 |
| 186,574 | Germany | June 26, 1907 |
| 371,352 | Great Britain | Apr. 19, 1932 |
| 524,079 | Germany | May 1, 1931 |